United States Patent
Morris et al.

(10) Patent No.: US 11,938,487 B1
(45) Date of Patent: Mar. 26, 2024

(54) FOAM GLASS AGGREGATE REDUCTION MACHINE

(71) Applicants: John M. Morris, Shamong, NJ (US); Kenneth J. Villano, Cherry Hill, NJ (US)

(72) Inventors: John M. Morris, Shamong, NJ (US); Kenneth J. Villano, Cherry Hill, NJ (US)

( * ) Notice: Subject to any disclaimer, the term of this patent is extended or adjusted under 35 U.S.C. 154(b) by 0 days.

(21) Appl. No.: 18/474,683

(22) Filed: Sep. 26, 2023

Related U.S. Application Data

(60) Provisional application No. 63/456,548, filed on Apr. 3, 2023.

(51) Int. Cl.
| | |
|---|---|
| *B02C 4/26* | (2006.01) |
| *B02C 4/28* | (2006.01) |
| *B02C 18/06* | (2006.01) |
| *B02C 18/14* | (2006.01) |
| *B02C 18/18* | (2006.01) |
| *B02C 18/22* | (2006.01) |
| *C03B 19/10* | (2006.01) |
| *C03C 11/00* | (2006.01) |

(52) U.S. Cl.
CPC ............... *B02C 4/26* (2013.01); *B02C 4/286* (2013.01); *B02C 18/062* (2013.01); *B02C 18/067* (2013.01); *B02C 18/145* (2013.01); *B02C 18/186* (2013.01); *B02C 18/2216* (2013.01); *B02C 18/2291* (2013.01); *C03B 19/108* (2013.01); *C03C 11/007* (2013.01); *B02C 2018/147* (2013.01)

(58) Field of Classification Search
CPC ... B02C 18/145; B02C 18/062; B02C 18/067; B02C 18/186; B02C 18/2216; B02C 18/2291; B02C 4/286
See application file for complete search history.

(56) References Cited

U.S. PATENT DOCUMENTS

| | | | | |
|---|---|---|---|---|
| 2,464,212 A | * | 3/1949 | Carter | B02C 9/04 |
| | | | | 241/11 |
| 3,226,041 A | * | 12/1965 | Graumann | B02C 9/00 |
| | | | | 241/230 |

(Continued)

FOREIGN PATENT DOCUMENTS

| | | | | | |
|---|---|---|---|---|---|
| CN | 107737649 A | * | 2/2018 | ............. | B02C 18/18 |
| CN | 116078518 A | * | 5/2023 | ............. | B02C 18/18 |
| DE | 2517583 A | * | 11/1976 | ......... | B02C 18/2291 |

*Primary Examiner* — Faye Francis
(74) *Attorney, Agent, or Firm* — Stuart M. Goldstein

(57) ABSTRACT

A foam glass aggregate slicing and reduction machine and system which rapidly, effectively, and economically reduces large pieces of aggregate to required sizes with minimal powdery waste. The machine comprises a foam glass aggregate collection chute having a bottom outlet section for discharging foam glass aggregate onto a holdbar located adjacent to the outlet section. A rotating roller supports a plurality of rotating roller knives which slices large pieces of foam glass aggregate to reduce the aggregate to fragments, with minimal powdery waste. A foam glass aggregate guide member directs foam glass aggregate towards the rotating roller. A foam glass aggregate filtering bar having rows of intervening spaces is located below the guide member and adjacent to the rotating roller.

6 Claims, 3 Drawing Sheets

(56) References Cited

U.S. PATENT DOCUMENTS

| | | | | |
|---|---|---|---|---|
| 3,362,649 | A | * | 1/1968 | Odden ...................... B02C 9/04 241/11 |
| 3,907,216 | A | * | 9/1975 | MacKissic .............. B02C 21/02 241/101.78 |
| 3,929,295 | A | * | 12/1975 | Montalbano ........ B02C 18/2291 241/606 |
| 4,351,485 | A | * | 9/1982 | Hardwick ............... B02C 18/16 241/285.3 |
| 4,564,146 | A | * | 1/1986 | Bleasdale ........... B02C 18/2291 241/37.5 |
| 4,815,667 | A | * | 3/1989 | Keller ...................... B03B 9/04 241/DIG. 38 |
| 5,199,654 | A | * | 4/1993 | Fulghum, Sr. ...... B02C 18/2291 241/37.5 |
| 5,405,093 | A | * | 4/1995 | Bozarth .................. F23G 5/033 241/34 |
| 5,452,860 | A | * | 9/1995 | Williams .............. B02C 18/145 241/242 |
| 2020/0331000 | A1 | * | 10/2020 | Silberstein .............. B02C 21/02 |

\* cited by examiner

FOAM GLASS AGGREGATE REDUCTION MACHINE

RELATED APPLICATION

This application claims the benefit of provisional Pat. App. Ser. No. 63/456,548, filed on Apr. 3, 2023.

FIELD OF THE INVENTION

The present invention relates to aggregate processing systems and particularly to a foam glass aggregate slicing and cutting machine.

BACKGROUND OF THE INVENTION

There are a variety of machines currently on the market which are used to break up or crush material, such as foam glass and like aggregate, to a size which is useable in the fabrication of construction materials. For example, broken up fragmented pieces of foam glass aggregate is used in making concrete. However, these current machines suffer from a distinct disadvantage, in that the foam glass aggregate fed into the machines is routinely crushed to such an extent that the aggregate is pulverized into powder. When foam glass is reduced to a powder, it is generally no longer useful as an effective construction material for many applications, including in its use as an ingredient in concrete.

In fact, even the most efficient current foam glass aggregate crushing machines, at best, waste 50% of the foam glass aggregate which they affect. In other words, approximately only one half of the aggregate which is feed into such machines is capable of being used in construction materials like concrete; the remainder constitutes unusable pulverized foam glass powder.

SUMMARY OF THE INVENTION

It is thus the object of the present invention to provide a foam glass aggregate slicing and reduction machine which overcomes the significant disadvantages and limitations of prior such machines.

It is another object of the present invention to provide a foam glass aggregate slicing and reduction machine which slices and cuts foam glass aggregate to fragmented pieces, thus reducing it to a usable size, e.g. approximately ⅜ of an inch or other required size, and with very limited amounts of foam glass powder. It is also an object of the present invention to provide a method of achieving this result.

It is still another object of the present invention to provide a foam glass aggregate slicing and reduction machine which reduces the size of foam glass aggregate to allow for its effective use in construction materials such as concrete.

It is a further object of the present invention to provide a foam glass aggregate slicing and reduction machine which limits the amount of waste, i.e. pulverized powder foam glass, to between 4% and 7%.

These and other objects are accomplished by the present invention, a foam glass aggregate slicing and reduction machine which rapidly, effectively, and economically reduces large pieces of aggregate to required sizes with minimal powdery waste. The machine comprises a foam glass aggregate collection chute having a bottom outlet section for discharging foam glass aggregate onto a holdbar located adjacent to the outlet section. A rotating roller supports a plurality of rotating roller knives. A foam glass aggregate guide member directs foam glass aggregate towards the rotating roller. A foam glass aggregate filtering bar having rows of intervening spaces is located below the guide member and adjacent to the rotating roller.

The novel features which are considered as characteristic of the invention are set forth in particular in the appended claims. The invention itself, however, both as to its design, construction and use, together with additional features and advantages thereof, are best understood upon review of the following detailed description with reference to the accompanying drawings.

DETAILED DESCRIPTION OF THE INVENTION

Figure 1:
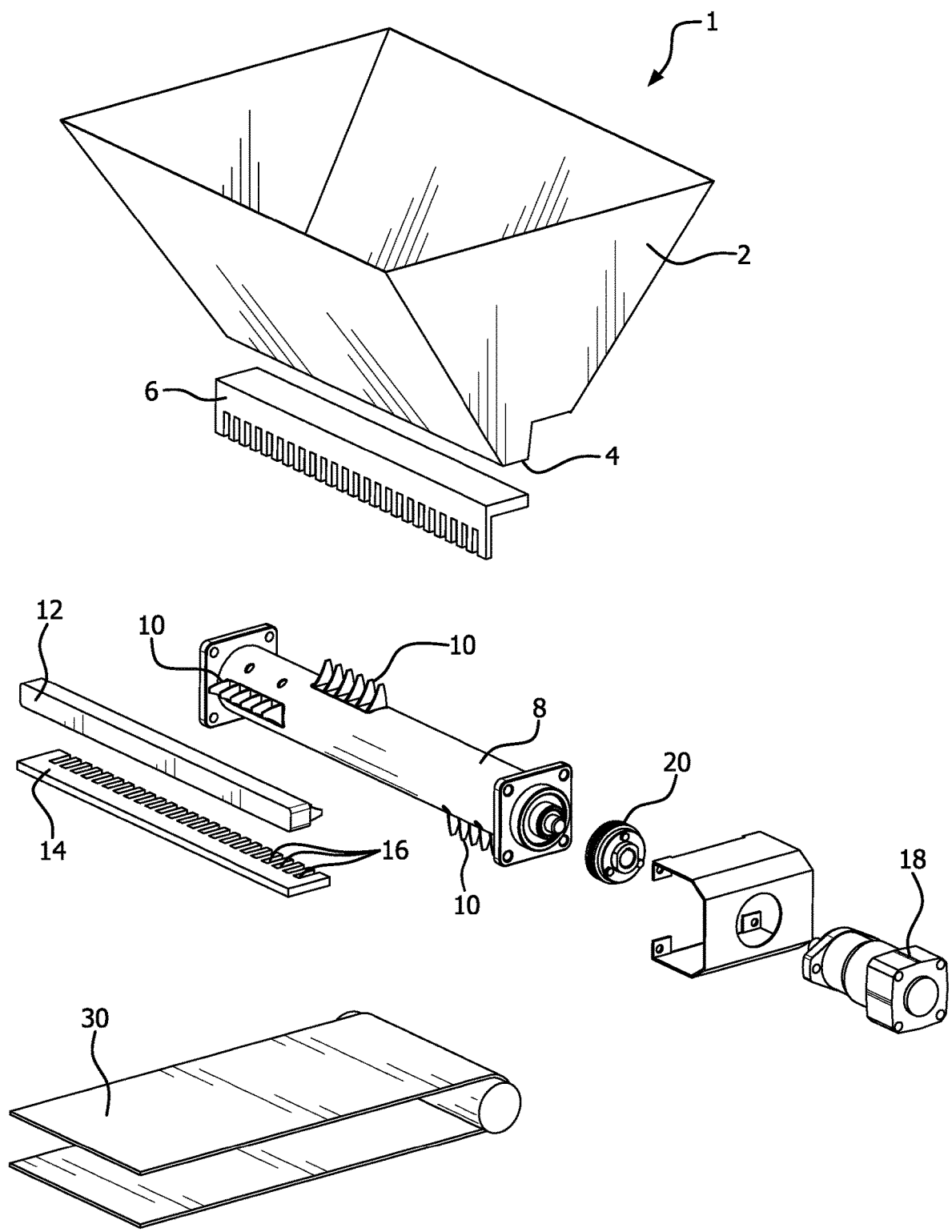
FIG. 1 is an exploded view detailing the components of the first station of an aggregate processing system comprising the foam glass aggregate slicing and reduction machine of the present invention.
Figure 2:
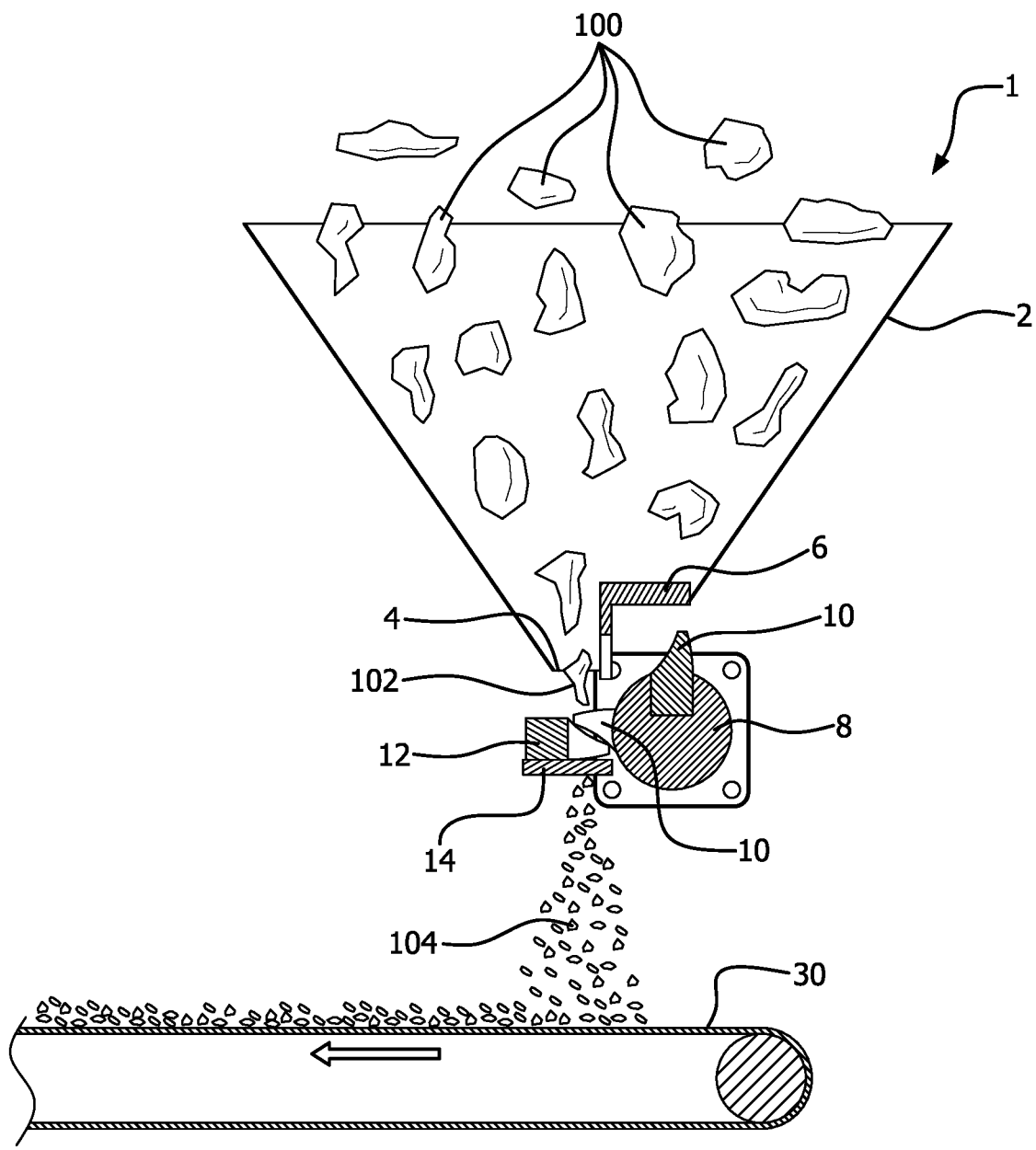
FIG. 2 is a sectional view of the foam glass aggregate slicing and reduction machine of the present invention, illustrating the method of its use.

Foam glass aggregate slicing and reduction machine 1 comprises foam glass aggregate open collection chute 2 for receiving foam glass aggregate 100. Collection chute 2 has bottom outlet section 4 for discharging foam glass aggregate 102 onto holdback bar 6 located adjacent to the bottom outlet section.

Rotating roller 8 has a plurality of roller knives 10 which are secured to and rotate along with the rotating roller. Roller 8 is powered by hydraulic motor 18 acting through standard clutch 20. Foam glass aggregate guide member 12 directs foam glass aggregate 102 toward rotating roller 8 and rotating knives 10.

Foam glass aggregate filtering and sizing bar 14 has rows of intervening spaces 16. Filtering bar 14 is located below guide member 12 and adjacent to rotating roller 8.

Figure 3:
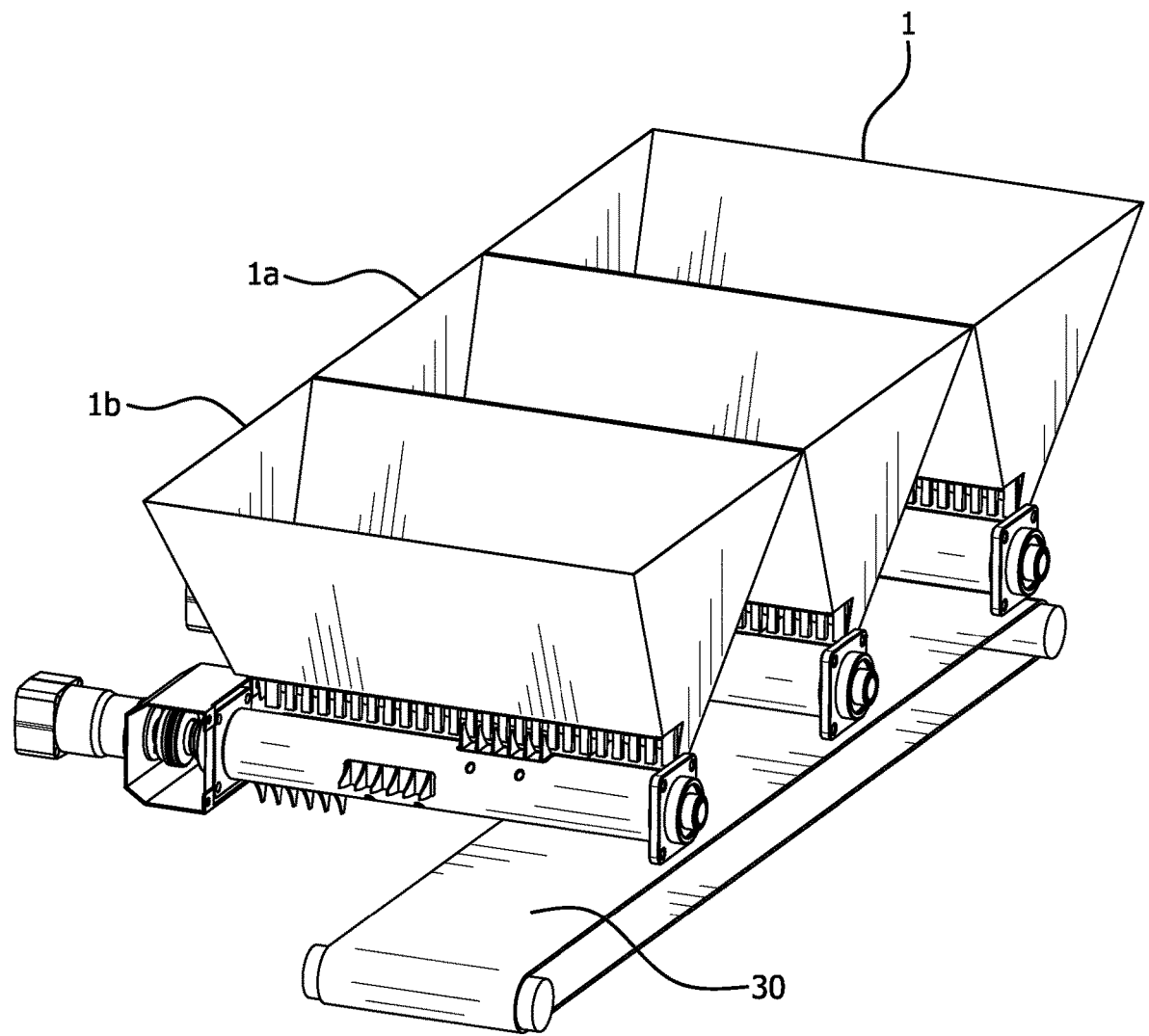
FIG. 3 is a perspective view of a foam glass aggregate processing system comprising a series of foam glass aggregate slicing and reduction machines of the present invention.

The system for slicing and reducing the size of foam glass aggregate is best and most efficiently utilize with a series of machines 1 of the present invention, arranged in series, and located above conveyor 30. See FIG. 3. Conveyor 30 transports fragmented pieces 104 of glass foam to trucks or other downstream destinations.

In operation, foam glass aggregate 100 of given large size pieces is inputted and enters chute bottom outlet section 4 where aggregate 102 is discharged. Aggregate 102 is directed to rotating roller 8 by holdback bar 6 and guide member 12. Aggregate 102 is then sliced by rotating roller knives 10 where it is reduced to foam glass fragmented pieces 104 which are smaller than the given large size pieces 100 which had entered collection chute 2. Foam glass fragmented pieces 104 are sliced so as to be approximately ⅜ of an inch or other required dimension, but in any event are sized to allow them to fall through intervening spaces 16 of filtering bar 14.

The cut up glass fragmented pieces 104 leave filtering bar 14 and then fall onto conveyor 30 where they are moved to the downstream destinations for use.

By the foam glass aggregate slicing and reducing machines of the present invention and the method of utilizing the machines, foam glass aggregate is effectively and efficiently cut from large pieces of aggregate into much smaller fragmented pieces with very limited foam glass powdery waste from the foam glass aggregate 100 entering collection chute 2 of only between 4% to 7%. These smaller fragmented pieces 104 are optimal for use in construction materials like concrete.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A machine for slicing and reducing the size of foam glass aggregate, said machine comprising:
    an open foam glass aggregate collection chute, said chute having a bottom outlet section for discharging foam glass aggregate onto an elongated, "L" shaped holdback bar located adjacent to and extending the length of the bottom outlet section;
    a single rotating roller supporting a plurality of rotating roller knives;
    a horizontally extending foam glass aggregate guide member located adjacent to the single rotating roller and the roller knives for directing foam glass aggregate towards the single rotating roller;
    the foam glass aggregate guide member being located on a horizontally extending foam glass aggregate filtering bar having a row of intervening spaces, said filtering bar being located adjacent and in spaced relation to the single rotating roller, wherein foam glass aggregate of given size pieces enters the collection chute and is discharged from the chute bottom outlet section, is directed to the single rotating roller by the holdback bar and guide member, and is sliced by the rotating roller knives on the single rotating roller and reduced to foam glass fragmented pieces which are smaller than the given size pieces which enter the collection chute, said fragmented pieces sliced so as to be sized to fall directly from the rotating roller onto and between the intervening spaces of the filtering bar.

2. The machine as in claim 1 wherein the sliced fragmented pieces are approximately ⅜ inch in size.

3. The machine as in claim 1 wherein between 4% and 7% of the sliced given size pieces are pulverized foam glass powder.

4. A system for slicing and reducing the size of foam glass aggregate, said system comprising:
    at least two machines for slicing and reducing the size of foam glass aggregate, each machine comprising:
        an open foam glass aggregate collection chute, said chute having a bottom outlet section for discharging foam glass aggregate onto an elongated, "L" shaped holdback bar located adjacent to and extending the length of the bottom outlet section;
        a single rotating roller supporting a plurality of rotating roller knives;
        a horizontally extending foam glass aggregate guide member located adjacent to the single rotating roller and the roller knives for directing foam glass aggregate towards the single rotating roller;
        the foam glass aggregate guide member being located on a horizontally extending foam glass aggregate filtering bar having a row of intervening spaces, said filtering bar being located adjacent and in spaced relation to the single rotating roller; and
    a moving foam glass aggregate receiving conveyor, wherein foam glass aggregate of given size pieces enters the collection chute and is discharged from the chute bottom outlet section, is directed to the single rotating roller by the holdback bar and guide member, and is sliced by the rotating roller knives on the single rotating roller and reduced to foam glass fragmented pieces which are smaller than the given size pieces which enter the collection chute, said fragmented pieces sliced so as to be sized to fall directly from the rotating roller onto and between the intervening spaces of the filtering bar and then onto the conveyor.

5. The machine as in claim 4 wherein the sliced fragmented pieces are approximately ⅜ inch in size.

6. The machine as in claim 4 wherein between 4% and 7% of the sliced given size pieces are pulverized foam glass powder.

* * * * *